US006216641B1

(12) United States Patent
Tracy et al.

(10) Patent No.: US 6,216,641 B1
(45) Date of Patent: Apr. 17, 2001

(54) ADJUSTABLE LENGTH LEASH

(75) Inventors: Richard J. Tracy, Elgin; Edward T. Eaton, Arlington Heights, both of IL (US); Robert C. Holt, Jr., North Canton, OH (US)

(73) Assignee: Coastal Pet Products, Inc., Alliance, OH (US)

( * ) Notice: Subject to any disclaimer, the term of this patent is extended or adjusted under 35 U.S.C. 154(b) by 0 days.

(21) Appl. No.: 09/369,140

(22) Filed: Aug. 5, 1999

(51) Int. Cl.[7] .................................................... A01K 27/00
(52) U.S. Cl. ............................................ 119/797; 119/798
(58) Field of Search ..................................... 119/797, 798, 119/801, 803, 804, 791, 792, 795, 796, 856, 858

(56) References Cited

U.S. PATENT DOCUMENTS

| D. 125,944 | 3/1941 | Stickell | D30/153 |
|---|---|---|---|
| D. 274,379 | 6/1984 | Talo | D30/153 |
| D. 341,682 | 11/1993 | Musetti | D30/153 |
| D. 351,264 | 10/1994 | Stout | D30/153 |
| D. 379,689 | 6/1997 | Levine et al. | D30/153 |
| D. 389,615 | 1/1998 | Leslie | D30/153 |
| D. 392,429 | 3/1998 | Plewa et al. | D30/153 |
| D. 402,426 | 12/1998 | Levine et al. | D30/153 |
| 1,375,912 | * 4/1921 | Huddle . | |
| 3,964,441 | * 6/1976 | Wall . | |
| 4,391,226 | * 7/1983 | Guthrie | 119/797 |
| 4,501,230 | * 2/1985 | Talo | 119/796 |

* cited by examiner

Primary Examiner—Charles T. Jordan
Assistant Examiner—Yvonne R. Abbott
(74) Attorney, Agent, or Firm—Renner, Kenner, Greive, Bobak, Taylor & Weber

(57) ABSTRACT

An adjustable length leash (10) includes a handle portion (11) having a grip (13) and a neck (20) extending from the grip (13) for taking up undesired length in the lead (12). The lead (12) attaches to the neck (20) by being knotted through an aperture (22). A minor flange (32) provided at the top of the neck (20) helps retain the loops of the lead (12) on the neck (20) to achieve a desired lead length. A catch flange (30) is capable of catching the lead (12) at the bottom of the neck (20) such that one who utilizes the leash (10) may adjust the length of the lead (12) by winding the lead (12) around the neck (20) until the desired length extends from catch flange (30). The catch flange (30) includes a lead lock (36) which allows for a more secure fixing of the lead (12) length. The grip (13) is angled with respect to the neck (20) such that no matter at which length the lead (12) is retained, the forces exerted on the lead (12) are focused substantially straight through the wrist and arm of one using the leash (10) thereby substantially eliminating any torque upon the user's wrist.

16 Claims, 2 Drawing Sheets

ADJUSTABLE LENGTH LEASH

TECHNICAL FIELD

The present invention relates generally to a leash device for animals. More particularly, the present invention relates to an adjustable length leash device wherein the length of the lead of the leash is adjusted by winding the lead around a handle portion of the leash device.

BACKGROUND ART

The typical leash used to control a pet consists of an elongated strap, or lead, which attaches to a pet's collar, and some type of grip or handle which the handler grasps in order to control the pet attached to the lead. With a common leash, the pet is free to move around an area defined by the length of the lead. The length of the lead is not normally adjustable although many people simply wrap excess lead length around their hand when they desire to decrease the pet's freedom of movement. This can be damaging to the hand and is thus undesirable. However, adjustable length leashes are desirable because, when greater restriction of the pet's movement is required, such as when walking the pet through a busy street or a crowded walkway, or when another animal appears and makes the pet uneasy, the handler can readily adjust the length of the lead in order to lessen the pet's freedom of movement and keep the pet under control. Because of the degree of control it provides to the handler, an adjustable length leash is also useful in training a pet.

Common in the marketplace today are retractable leash devices wherein the lead is wound around a spring-biased spool retained within the handle portion of the leash device. The spring bias ensures that slack in the lead is constantly taken up by the spool; however, the length of the lead may be fixed by operating a switch located on the handle that causes a pawl to engage the spool and stop its biased rotation. Because of their relatively complex construction, these devices are more complicated to manufacture and therefore much more expensive than the common leash. Also these devices are more likely to wear out and break due to the multiple components employed in their construction.

Attempts have been made to provide adjustable length leashes which are more simple to manufacture and therefore inexpensive. These leash devices include a handle portion having a grip from which extends a thin neck having an upper flange and a lower flange. A lead is connected to the handle portion, and the length of the lead may be adjusted by wrapping the lead around the neck until the desired lead length is achieved. The upper and the lower flanges are designed in an attempt to prevent the lead from de-spooling from around the neck.

This leash, while inexpensive and simple to manufacture, has its own drawbacks. For example, having two flanges capable of retaining the lead creates a situation where the force of the pet's pull may alternate between the upper flange and the lower flange when the lead length is adjusted. This is uncomfortable and can cause soreness in the handler's wrist. Also, the thin design of the neck requires a large amount of winding in order to adjust the length of the lead or to wind the lead for storage. Additionally, this leash device fails to address the desirable concept of a locking mechanism by which the length of the lead, when extended or retracted to the desired length, can be more fixedly secured so as to ensure that, even when a pet forcefully pulls upon the lead, the lead will not have a tendency to de-spool from the neck portion.

Improvements over the prior art may also be achieved by concentrating on the ergonomics of the handle design. Specifically, it is desirable, although not addressed by the prior art, that regardless of what length the lead is retained at, the forces exerted on the lead and handle portion be focused substantially straight through the wrist and arm of one using the adjustable length leash, thereby substantially eliminating any torque upon the user's wrist.

Thus, the need exists in the art for an improved adjustable length leash which allows the handler to selectively adjust and secure the length of the lead extending from the handle portion, which is simple and inexpensive to manufacture, having few or no component parts readily susceptible to breaking or wearing out, and which focuses the forces exerted on the lead and handle portion straight through the wrist and arm of the handler.

DISCLOSURE OF THE INVENTION

It is therefore an object of the present invention to provide an adjustable length leash that effectively manages lead length by providing a means of incrementally adjusting and controlling the length of the lead.

It is another object of the present invention to provide an adjustable length leash, as above, which is inexpensive to manufacture.

It is still another object of the present invention to provide an adjustable length leash, as above, wherein the leash is devoid of any mechanisms that could break or wear out.

It is yet another object of the present invention to provide an adjustable length leash, as above, in which the lead may be fixedly locked at a desired length.

It is a further object of the present invention to provide an adjustable length leash, as above, having a configuration such that, irrespective of the length at which the lead is retained, the forces exerted on the lead are focused substantially straight through the wrist and arm of one using the leash, thereby substantially eliminating any torque upon the user's wrist.

These and other objects of the present invention, as well as the advantages thereof over existing prior art forms, which will become apparent from the description to follow, are accomplished by the improvements hereinafter described and claimed.

In general, an adjustable length leash made in accordance with the present invention includes a lead connected to a handle portion which includes a grip. A neck extends from the grip and provides a winding area for the lead so that the length of the lead can be adjusted by winding the lead around the neck. A lead lock maintains the established length of the lead.

In accordance with another aspect of the present invention, an adjustable length leash includes a lead connected to a handle portion which includes a grip. A neck extends from the grip and provides a winding area for the lead so that the length of the lead can be adjusted by winding the lead around the neck. A catch flange maintains the established length of the lead when the lead is wound on the neck and positioned to extend around the catch flange such that the catch flange prevents the leads from unwinding from around the neck. A minor flange retains the wound portion of the lead on the neck.

In accordance with other aspects of the present invention, an adjustable length leash includes a lead connected to a handle portion which includes a grip. A neck extends from the grip and provides a winding area for the lead so that the length of the lead can be adjusted by winding the lead around the neck. A catch flange maintains the established length of the lead when the lead is wound on the neck and positioned to extend around the catch flange such that the catch flange prevents the lead from unwinding from around the neck. The neck extends from the grip at an angle such that, when the established length of the lead is maintained by the catch flange, the forces exerted on the lead are focused through the wrist and arm of the handler using the adjustable length leash. The angle between the neck and the grip thereby substantially eliminates any torque upon the user's wrist.

A preferred exemplary adjustable length leash incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
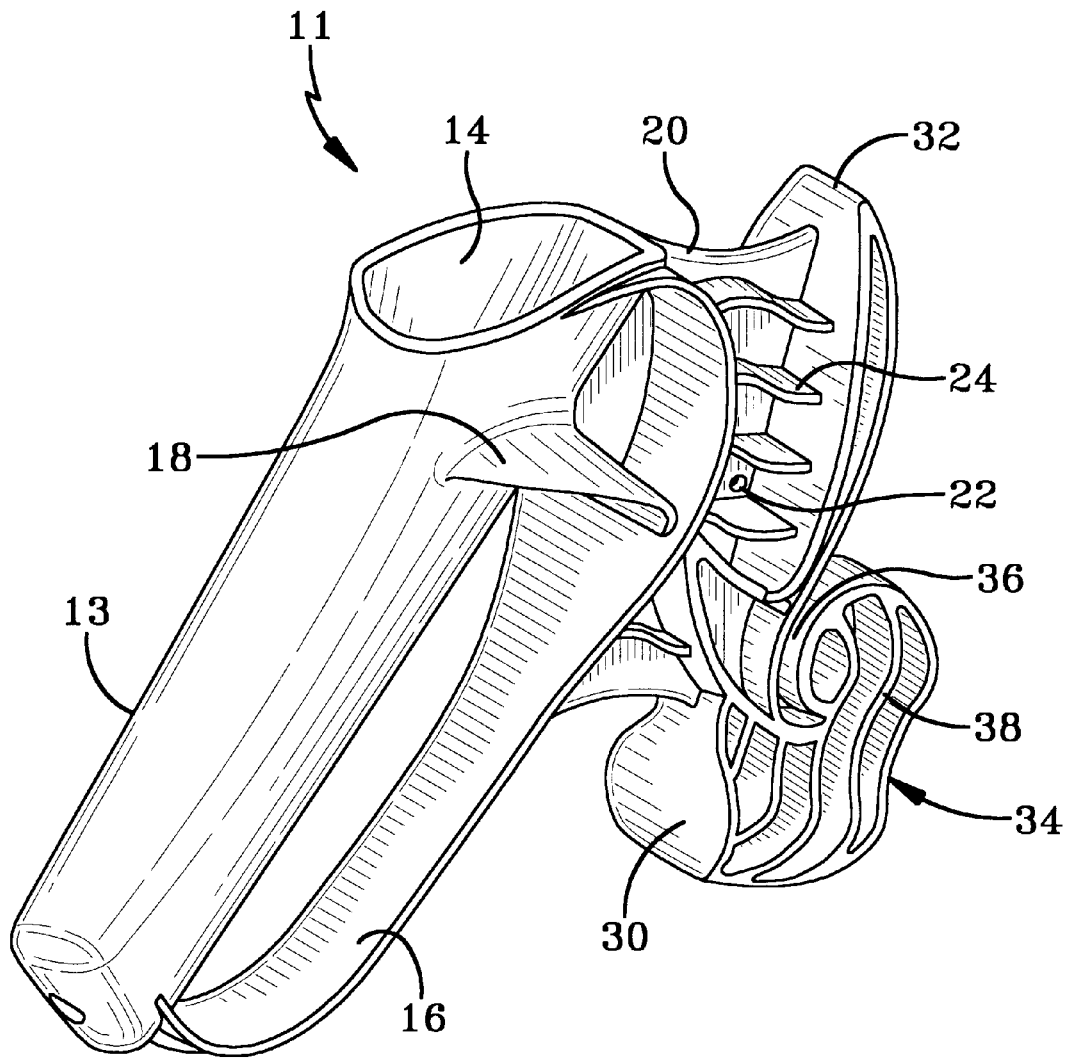
FIG. 1 is a perspective view of a preferred embodiment of the handle portion of the adjustable length leash of the present invention.
Figure 2:
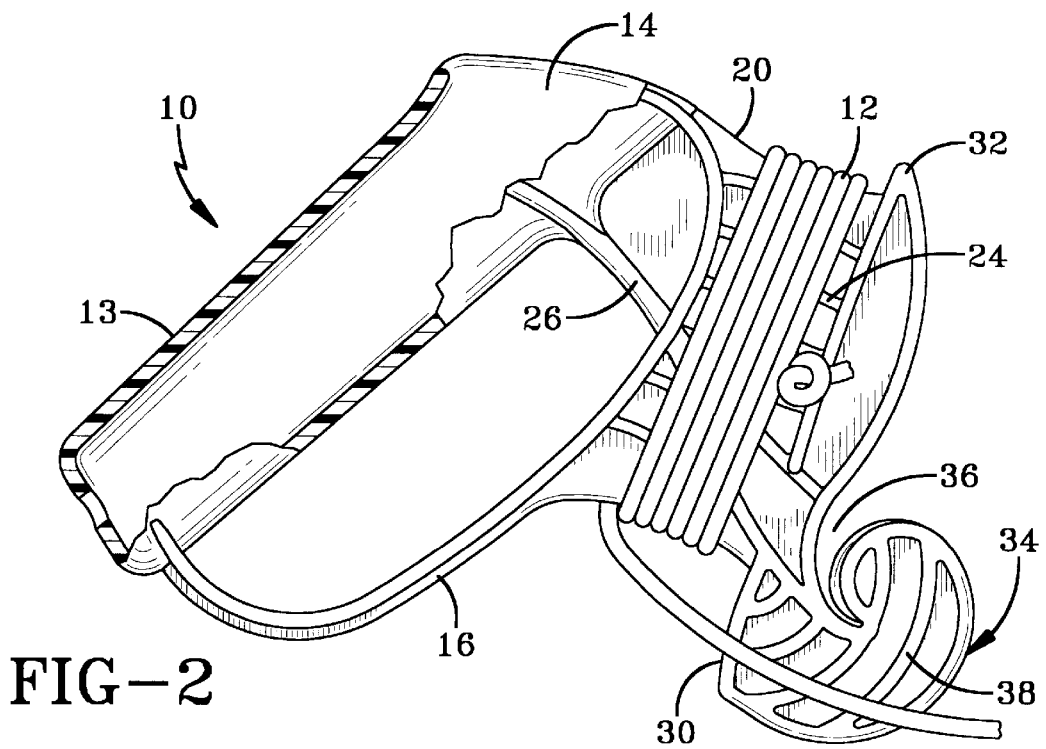
FIG. 2 is a partially sectioned, partially broken away side elevational view of the adjustable length leash of the present invention.
Figure 3:
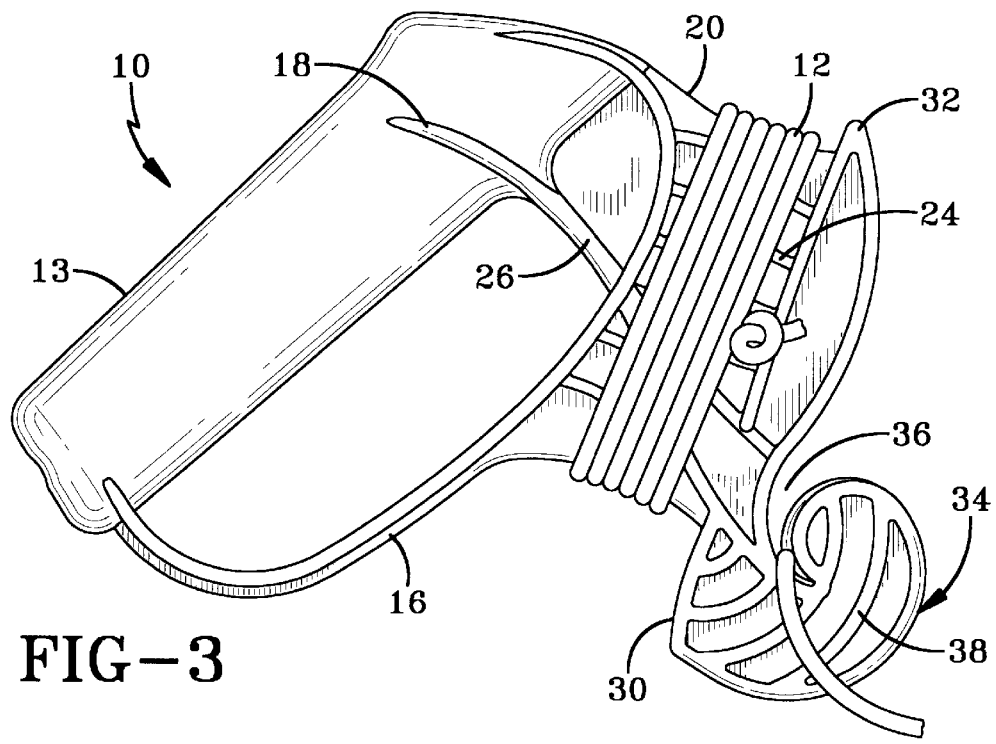
FIG. 3 is a side elevation of the adjustable length leash of the present invention.

An adjustable length leash of the present invention is designated generally by the numeral 10 in FIGS. 2 and 3 and includes a handle portion generally indicated by the numeral 11 to which is attached a lead 12. Handle portion 11 is preferably of a one-piece plastic injection molded construction, although the present invention should not be limited thereto or thereby. Indeed, constructing the basic handle design from metals or plastics, which may have a rubber grip overlay, is contemplated.

Handle portion 11 includes a grip 13 which preferably is formed with a hollow cavity 14 for the storage of plastic baggies, animal treats, and other similar items which may be useful when walking an animal. A guard 16 extends from grip 13 and serves to protect a user's hand while adding structural support and strength to handle portion 11. A thumb rest 18 also extends from grip 13 and, as will become more apparent from the description hereinbelow, aids the handler in utilizing lead device 10.

A neck 20 extends from grip 13 and guard 16 and provides a winding area for lead 12. Lead 12 attaches near the center of neck 20 by means of an aperture 22. To that end, lead 12, as can be seen most clearly in FIG. 3, is inserted through aperture 22 and tied off so as to be secured thereat. The length of lead 12 extending from handle portion 11 may be easily adjusted by winding lead 12 around neck 20, either manually or by rotating handle portion 11 about leash 12. As can be readily seen from the drawings, neck 20 is quite large in size in comparison with handle portion 11 as a whole. Such ensures that adjusting the length of lead 12 will not require winding lead 12 about neck 20 a large number of times. Preferably, the depth and width of neck 20 are sized so that lead 12 may be fully wound about neck 20 for convenient storage with only about 12 to 15 turns of lead 12 around neck 20. To ensure that neck 20 is sufficiently strong enough to perform without breaking, neck 20 is constructed having ribs 24. A major rib 26 provides additional structural support to neck 20 by increasing the direct connection of neck 20 to grip 13. In the preferred embodiment, major rib 26 is continuous with thumb rest 18. Thumb rest 18 can thus aid in winding lead 12 around neck 20 by providing the handler with leverage when manipulating handle portion 11 to wind lead 12 around neck 20.

When lead 12 is wound about neck 20 to achieve a desired lead length, lead 12 can be retained at that length by a catch flange 30. As can be seen in FIG. 2, the length of lead 12 can be selectively adjusted and secured by winding lead 12 around neck 20 until the desired lead length is reached and then passing lead 12 behind catch flange 30 such that, when lead 12 is pulled taut, catch flange 30 extends below lead 12 and prevents lead 12 from unwinding from around neck 20.

The length of lead 12 may also be readily extended simply by manipulating handle portion 11. Handle portion 11 can be tilted upward such that catch flange 30 rises above lead 12 thereby allowing lead 12 to pass under catch flange 30 and unwind from around neck 20. When the desired lead length has been played out, lead 12 can be retained at its new length by tipping handle portion 11 forward so that catch flange 30 once again extends below lead 12, preventing it from unwinding from around neck 20.

In the event that the windings of lead 12 spooled around neck 20 may have a tendency to shift during use of leash 10, it is preferred that handle portion 11 include a minor flange 32. Minor flange 32 prevents the loops of leash 12 from spontaneously migrating so as to slip off of neck 20; however, minor flange 32 is sized small enough that lead 12 may not be retained thereby in the same manner as it is by catch flange 30. Allowing lead 12 to be retained by catch flange 30 and not minor flange 32, eliminates the discomfort of having the forces exerted on lead 12 oscillate between two catch points.

Realizing that it may be more convenient to play out a certain, manageable length of lead 12 and subsequently fixedly lock off its length, a protrusion, generally indicated by the numeral 34, extends from catch flange 30 and provides a lead lock 36. Lead lock 36 substantially eliminates all possibility of lead 12 de-spooling from around neck 20. After winding lead 12 around neck 20 as described hereinabove, lead lock 36 is utilized by simply sliding lead 12 into lead lock 36, as shown in FIG. 3. When utilized, lead lock 36 could be subject to large pulling forces and is therefore reinforced by ribs 38.

Catch flange 30 and lead lock 36 are preferably located near the bottom of neck 20 such that the direction in which lead 12 extends is aligned substantially straight through the wrist and forearm of the handler holding grip 13. To that end, neck 20 extends from grip 13 at an angle so as to aid in this alignment. It should be readily apparent that, regardless of whether catch flange 30 or lead lock 36 is utilized to lock off lead 12, lead 12 will extend in substantially the same direction and the forces exerted on lead 12 will be focused substantially straight through the wrist and arm of the handler using leash 10.

In light of the foregoing, it should thus be evident that an adjustable length leash constructed as described herein substantially improves the art and otherwise accomplishes the objects of the present invention.

What is claimed is:

1. An adjustable length leash comprising a handle portion and a lead connected to said handle portion; said handle portion including a grip, a neck extending from said grip, and a lead lock, said lead being selectively wound on, or unwound from, said neck to establish a length for said lead, said lead lock being capable of maintaining the established length, said neck being positioned between said grip, and said lead lock.

2. An adjustable length leash comprising a handle portion and a lead connected to said handle portion; said handle portion including a grip, a neck extending from said grip, a lead lock, said lead being selectively wound on, or unwound from, said neck to establish a length for said lead, said lead lock being capable of maintaining the established length, and a catch flange capable of maintaining the established length of said lead when said lead is wound on said neck and positioned to extend around said catch flange such that the ability for said lead to unwind from said neck is impeded by said catch flange.

3. An adjustable length leash according to claim 2 further comprising a minor flange extending from said neck such that when said lead is wound on said neck, said minor flange retains the wound portion of said lead on said neck.

4. An the adjustable length leash according to claim 2 wherein said catch flange extends from the bottom of said neck.

5. An adjustable length leash according to claim 2 further comprising reinforcement ribs on said neck and said catch flange.

6. An adjustable length leash according to claim 2 wherein said lead lock extends from said catch flange.

7. An adjustable length leash according to claim 2 wherein said neck extends from said grip at an angle such that, when the established length of said lead is maintained by said catch flange, the forces exerted on said lead are focused through the wrist and arm of one using the adjustable length leash thereby substantially eliminating any torque upon the user's wrist.

8. An adjustable length leash according to claim 7 wherein said lead lock extends from said catch flange such that, when the established length of said lead is maintained by said lead lock, the forces exerted on said lead are focused through the wrist and arm of one using the adjustable length leash thereby substantially eliminating any torque upon the user's wrist.

9. An adjustable length leash according to claim 1 wherein said grip portion includes a hollow core.

10. An adjustable length leash comprising a handle portion and a lead connected to said handle portion; said handle portion including a grip, a neck extending from said grip and providing an area upon which said lead may be wound to establish a length for said lead, a catch flange capable of maintaining the established length of said lead when said lead is wound on said neck and positioned to extend around said catch flange such that the ability for said lead to unwind from said neck is impeded by said catch flange, and a minor flange retaining the wound portion of said lead on said neck.

11. An adjustable length leash according to claim 10 further comprising a lead lock extending from said catch flange and capable of engaging said lead to hold said lead at the established length.

12. An adjustable length leash according to claim 11 wherein said lead lock extends from said catch flange such that when the established length of said lead is maintained by said lead lock, the forces exerted on said lead are focused through the wrist and arm of one using the adjustable length leash thereby substantially eliminating any torque upon the user's wrist.

13. An adjustable length leash according to claim 10 further comprising reinforcement ribs on said neck and said catch flange.

14. An adjustable length leash according to claim 10 wherein said grip portion includes a hollow core.

15. An adjustable length leash according to claim 10 wherein said neck extends from said grip at an angle such that when the established length of said lead is maintained by said catch flange, the forces exerted on said lead are focused through the wrist and arm of one using the adjustable length leash thereby substantially eliminating any torque upon the user's wrist.

16. An adjustable length leash comprising a handle portion and a lead connected to said handle portion; said handle portion including a grip, a neck extending from said grip, and a catch flange, said lead being selectively wound on, or unwound from, said neck to establish a length for said lead, said catch flange being capable of maintaining the established length of said lead when said lead is wound on said neck and positioned to extend around said catch flange such that the ability for said lead to unwind from said neck is impeded by said catch flange, wherein said neck extends from said grip at an angle such that when the established length of said lead is maintained by said catch flange, the forces exerted on said lead are focused through the wrist and arm of one using the adjustable length leash thereby substantially eliminating any torque upon the user's wrist.

\* \* \* \* \*